March 12, 1957     V. R. FRANER ET AL     2,785,087

PRESSURE-SENSITIVE ADHESIVE MARKING TAPE

Filed June 15, 1953

INVENTORS
VICTOR R. FRANER
ARMIN H. STEINHAUSER
BY
Carpenter, Abbott, Coulter & Kinney
ATTORNEYS United States Patent Office 2,785,087
Patented Mar. 12, 1957

2,785,087

PRESSURE-SENSITIVE ADHESIVE MARKING TAPE

Victor R. Franer and Armin H. Steinhauser, St. Paul, Minn., assignors to Minnesota Mining & Manufacturing Company, St. Paul, Minn., a corporation of Delaware Application June 15, 1953, Serial No. 361,676

1 Claim. (Cl. 117—68.5)

This invention relates to pressure-sensitive adhesive tape having a pressure-sensitive adhesive bonded to one surface of a non-fibrous film backing the opposite (back) surface of which is capable of accepting pencil markings.

Smooth non-fibrous films such as cellophane have been widely used as backings for both transparent and colored or opaque pressure-sensitive adhesive tapes. Such films cannot be effectively marked with an ordinary lead-pencil. Hence such tapes cannot be used for price tags, labels, and other applications involving pencil-marking of the tape surface.

It is therefore an object of the invention to provide a pressure-sensitive adhesive tape having a cellophane or equivalent backing on which effective pencil-marking is possible.

Cellophane which has been roughened by scraping or sand-blasting, or by abrasion with fine sandpaper, may be marked with a pencil. But such roughened surfaces provide improved anchorage for pressure-sensitive adhesives, due presumably to the greatly increased surface area. Hence film backings having roughened back surfaces are apt to cause failure of the tape product through adhesive splitting or offsetting during unwinding from roll form.

The stress placed on the backing member during unwinding of pressure-sensitive adhesive tape from roll form is known to be high. Various coatings have been applied to cellophane in attempts to decrease such stress. Many of these have been found to pull away from the cellophane film and to remain on the adhesive-coated surface, thus destroying the adhesive value of the tape product.

The present invention provides means for obtaining a roughened surface on cellophane and other film backings, suitable for marking with an ordinary lead-pencil, without causing either offsetting or splitting of the adhesive layer or loss of adhesion of the adhesive surface.

Figure 1:
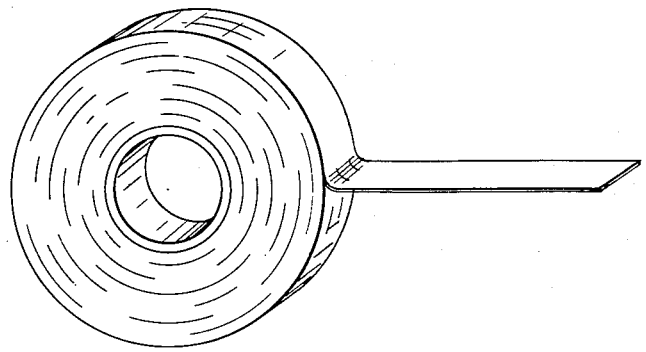
Figure 2:
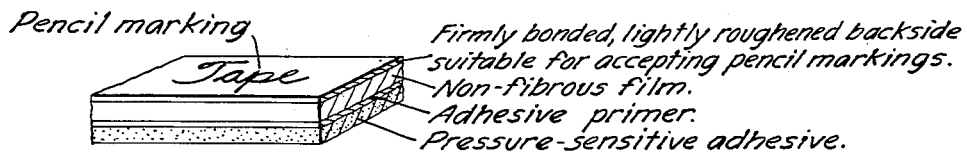
Figure 3:

In the drawing, Figure 1 represents the novel tape product of this invention in roll form, Figure 2 illustrates in perspective a section of the tape carrying the word "Tape" inscribed in pencil on the back surface thereof, and Figure 3 is a plan view of a section of the tape carrying a printed border and useful as a pressure-sensitive adhesive label or sticker.

Marking tape made in accordance with the structure indicated in Figure 2 is produced as follows:

The film backing member is plain (uncoated) transparent cellophane, desirably in a thickness of about 1.5 mils. One side of the film is lightly coated with a uniform film of an adhesive primer, and the other side with a "back-size" coating designed to accept pencil markings. A pressure-sensitive adhesive layer is then applied to the primed surface, and the completed product is slit into desired widths and wound on suitable cores or mandrels into roll form.

Conventional adhesive primer and pressure-sensitive adhesive formulations are suitable. One such primer consists of a mixture of polyvinyl alcohol and natural rubber latex in an aqueous vehicle, applied to the cellophane under conditions which provide a continuous uniform but very thin layer without causing wrinkling of the film. An adhesive which has given excellent results when applied to the primed and pre-dried film consists of a white pigmented mixture of equal parts by weight of natural rubber, rubbery butadiene-styrene polymer, and a tackifier resin such as a non-acidic terpene resin or a polymerized rosin, applied from solution in a volatile liquid solvent.

The backsize coating composition is made in several steps. In the first step, 100 parts by weight of bleached bone-white de-waxed shellac is dissolved in a mixture of 375 parts water, 200 parts alcohol, and 25 parts concentrated aqueous ammonia. Separately there is prepared a solution of 100 parts casein in 750 parts water and 50 parts ammonia, with 10 parts beta-naphthol added as a preservative. The casein is first soaked in the water at 125–150° F. for 10–15 minutes; addition of the ammonia with stirring then provides a smooth solution. The two solutions are next mixed together, and to the uniform mixture is then added 37.5 parts of glycerine and 250 parts of Loomis talc, a fibrous talc composed of 62% $SiO_2$, 26% MgO, 5% CaO. The well-blended mixture is then ready for application. It is coated on the unprimed surface of the cellophane in a smooth, even, uniform, continuous layer which after drying weighs about 1.0–1.5 grains per 24 sq. in. The coating produces a slight haziness but is essentially transparent.

Where desired, the tape may be printed with designs, borders, etc. as indicated in Figure 3. In such cases it is preferred to employ a pigmented adhesive primer composition in forming the design. A suitable formula is provided by adding a pigment to the polyvinyl alcohol rubber latex mixture hereinbefore mentioned. The design may be applied directly to the cellophane and then covered with a further layer of unpigmented primer, or may be applied over an initial prime coat; and may be in one or several colors.

Loomis talc, as hereinabove identified, is a preferred example of an inorganic inert powder material which provides an excellent writing surface without unduly opacifying the coating or otherwise detracting from the appearance and operation of the tape product. Asbestine, finely divided silica, powdered chalk, and other analogous inert powders are also effective but in their usual commercial forms are somewhat less desirable. Replacing half of the quantity of talc required in the above formula with one-half its weight of silica gel ("Santocel") provides a surface which is equally receptive of pencil markings and shows somewhat improved receptivity for ink.

The combination of shellac, or other alkali-dispersible, alcohol-soluble, hydrocarbon-insoluble gum such as Manila gum, and casein or other hydrophilic colloidal agglutinant such as polyvinyl alcohol, serves to bond the inert powder firmly to the cellophane, thus providing a uniformly and almost unnoticeably roughened surface which is easily marked with an ordinary lead-pencil. At the same time, this specific combination of binders and modifiers provides a surface to which the pressure-sensitive adhesive layer attains no more than the normal adhesion value to uncoated cellophane, so that in spite of the obviously greatly increased surface area the tape may readily be unwound from roll form without splitting or offsetting of the adhesive layer. Furthermore the combination of binders adheres firmly to the cellophane surface and to the talc particles, so that the coating neither flakes nor chalks on to the adhesive surface when the tape is unwound from roll form.

Having described various embodiments of the invention for the purposes of illustration rather than limitation, what is claimed is as follows:

A pressure-sensitive adhesive marking tape for receiving pencil-markings, having a non-fibrous film backing member prime-coated on one side with an adhesive primer composition and coated thereover with a layer of pressure-sensitive adhesive, characterized by having on the other side of said backing a thin uniform dried residual layer of a composition consisting essentially of:

| | Parts by weight |
|---|---|
| Shellac | About 100 |
| Casein | About 100 |
| Glycerine | About 37.5 |
| Fibrous talc | About 125 |
| Powdered silica gel | About 62.5 |
| Ammonia | About 75 |
| Alcohol | About 200 |
| Water | About 1125 |

References Cited in the file of this patent

UNITED STATES PATENTS

| 2,027,436 | Kallander | Jan. 14, 1936 |
| 2,032,845 | Humphner | Mar. 3, 1936 |
| 2,269,712 | Drew | Jan. 13, 1942 |
| 2,439,481 | Martin | Apr. 13, 1948 |